United States Patent [19]
Biazzo

[11] 3,897,747
[45] Aug. 5, 1975

[54] SHIFT INDICATOR MECHANISM
[75] Inventor: Corrado F. Biazzo, Davison, Mich.
[73] Assignee: General Motors Corporation, Detroit, Mich.
[22] Filed: Aug. 21, 1974
[21] Appl. No.: 499,309

[52] U.S. Cl. ......... 116/36; 116/129 F; 116/DIG. 20
[51] Int. Cl. .............................................. G09f 9/00
[58] Field of Search ...... 116/124 R, 124 AT, 129 F, 116/36, DIG. 20

[56] References Cited
UNITED STATES PATENTS

| | | | |
|---|---|---|---|
| 2,549,096 | 4/1951 | Jacobi | 124 AT/124 AT R |
| 3,554,156 | 1/1971 | Kishida et al. | 116/124 AT |
| 3,739,741 | 6/1973 | Freyermuth | 116/124 R |
| 3,805,733 | 4/1974 | Gilbert | 116/DIG. 20 |

Primary Examiner—Jerry W. Myracle
Assistant Examiner—Daniel M. Yasich
Attorney, Agent, or Firm—John P. Moran

[57] ABSTRACT

A compact, limited-space, automotive shift indicator mechanism including a front plate which serves as a dial, a back plate abutted against the front plate and secured thereto by crimping tabs formed on the latter around the edges of the former, a lateral trough-shaped pocket formed in the back plate for housing a body bearing a pointer, and a coil spring compressed in said pocket between a face of the body and an end of the pocket, and a cable connected at one end thereof to a connector member formed on the face of the body and extended through the spring and thence, through an opening in the end of the pocket for operative connection at the other end thereof with shift tube for selectively moving the pointer linearly across the dial.

3 Claims, 4 Drawing Figures

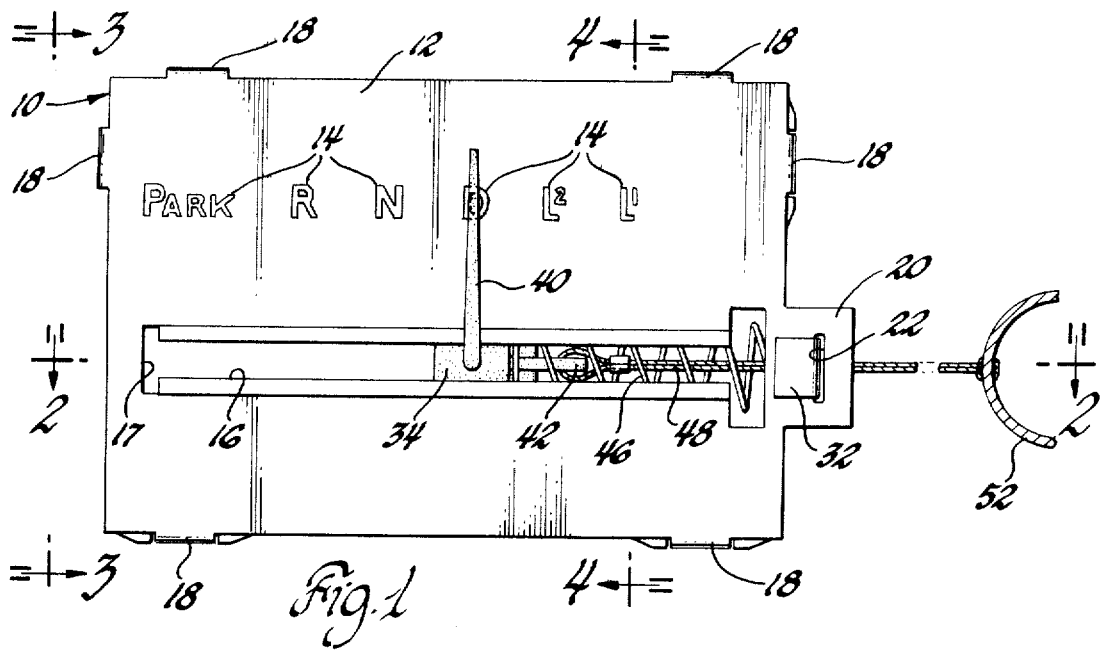
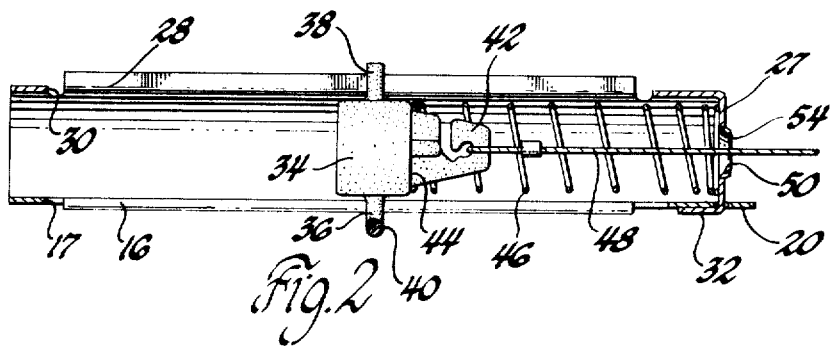
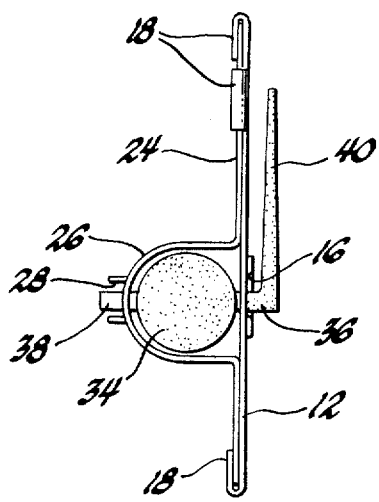
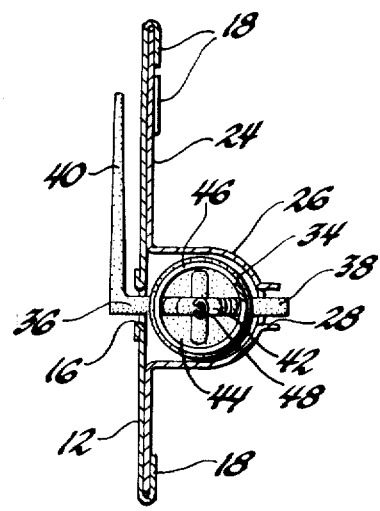

SHIFT INDICATOR MECHANISM

This invention relates generally to shift indicator mechanisms for automotive instrument panels and, more particularly, to a limited-space shift indicator assembly.

With the advent of small cars and the addition of various types of passenger restraint systems on and around the instrument panel, there may be a need for a small, compact, instrument panel-mounted shift indicator mechanism.

Accordingly, an object of the invention is to provide an improved compact, efficient and readily assembled and installed shift indicator mechanism.

Another object of the invention is to provide an improved shift indicator mechanism including a front plate which serves as a dial, a back plate abutted against the front plate and including a trough-like lateral pocket, a pointer formed on a body mounted in the pocket, a compression spring for urging the pointer toward PARK position, and a cable secured at one end to the body, extended through the spring and connected at the other end to a shift tube for pulling the pointer linearly along the dial to selected shift indicator positions thereacross.

These and other objects and advantages of the invention will be apparent when reference is made to the following description and accompanying drawings, wherein:

FIG. 1 is a front view of a shift indicator assembly embodying the invention;

FIG. 2 is a cross-sectional view taken along the plane of line 2—2 of FIG. 1, and looking in the direction of the arrows;

FIG. 3 is a cross-sectional view taken along the plane of line 3—3 of FIG. 1, and looking in the direction of the arrows; and FIG. 4 is a cross-sectional view taken along the plane of line 4—4 of FIG. 1, and looking in the direction of the arrows.

Referring now to the drawings in greater detail, FIG. 1 illustrates a shift indicator mechanism 10 including a front plate 12 having suitable shift selector symbols or indicia 14 formed on the upper portion thereof. Typically, such indicia would be PARK or P, and R, N, D, $L^2$, and $L^1$. A lateral slot 16 is formed across all but the end-portions of the front plate 12 at a central portion thereof. An edge 17 of the slot 16 forms a first end-stop for a purpose to be described. A plurality of retention tabs 18 are formed on the edges of the front plate 12, while a tab 20 having a slot 22 formed therethrough is formed on the edge of the front plate 12 adjacent the end of the lateral slot 16.

A back plate 24 (FIGS. 3 and 4) abuts against the front plate 12 and is retained thereagainst by virtue of the retention tabs 18 of the front plate 12 being bent around the edges of the back plate 24, as shown in FIG. 3. A trough-like or U-cross-sectional-shaped pocket 26 having a closed end 27 (FIG. 2) is formed on the back plate 24 in lateral alignment with the slot 16 formed across the front plate 12. A narrow lateral slot 28 (FIG. 4) is formed across all but the end-portions of the pocket 26 parallel to the slot 16. An edge 30 of the slot 28 forms a second end-stop for a purpose to be described. A tab 32 is formed on the closed end 27 of the pocket 26, extending through the slot 22 in the tab 20 of the front plate 12 and bent down thereon to help retain the plates 12 and 24 abutted together.

A solid round pointer body 34 is loosely mounted in the pocket 26. Oppositely disposed protrusions or pin-like extensions 36 and 38 are formed at a midpoint along the peripheral surface of the body 34, extending through the lateral slots 16 and 28, respectively. A vertical pointer 40 is formed on the end of the extension 36, outside of and parallel to the front plate 12, extending past the indicia 14.

A hook-like tab 42 (FIG. 2) is formed on the right end-face 44 of the body 34. Suitable resilient means, such as a coil spring 46, is mounted around the tab 42 and compressed between the right end-face 44 and the closed end 27, urging the pointer 40 toward the left or PARK position. A cable 48 is connected at one end thereof to the tab 42 and extended therefrom through the center of the coil spring 46 and, thence, through an opening 50 (FIG. 2) formed in the closed end 27 of the pocket 26. The extended end of the cable 48 is operatively connected to a shift tube 52 (FIG. 1) in a conventional manner. A smooth rounded edge 54 (FIG. 2) may be formed around the opening 50 to permit free sliding movement thereover of the cable 48 in response to rotation of the shift tube 52.

With respect to the assembly process of the shift indicator mechanism 10, the cable 48 is first attached to the tab 42 and then threaded through the coil spring 46. The spring 46 and body 34 are next placed in the pocket 26 of the back plate 24, with the extension 38 inserted into the lateral slot 28 and the cable 48 inserted through the opening 50. The front plate 12 is then abutted against the back plate 24, with the pointer 40 and extension 36 being progressively inserted through the lateral slot 16. The retention tabs 18 of the front plate 12 are now crimped over the edges of the back plate 24, securing the two plates in an abutting relationship to complete the assembly process. Once assembled, the shift indicator mechanism 10 is readily installed onto an automotive instrument panel [not shown].

It is obvious that the compressed spring 46 will urge the body 34 leftwardly in FIGS. 1 and 2, with the leftward movement of the body 34 being limited by the abutment of the oppositely disposed extensions 36 and 38 against the respective end-stops 17 and 30 (FIG. 2). As the shift tube 52 is rotated, the cable 48 will slide over the rounded edge 54 of the opening 50, pulling the pointer body 34 linearly against the force of the spring 46 to the right in FIG. 1, until the pointer 40 is selectively aligned with one of the shift ratio symbols, i.e., one of R, N, D, $L^2$, or $L^1$.

It is apparent that the invention provides an improved compact, efficient and readily assembled shift indicator mechanism adaptable to being installed in a limited space on an automotive instrument panel.

While but one embodiment of the invention has been shown and described, other modifications thereof are possible.

I claim:

1. A shift indicator mechanism comprising front and rear plate members, said front plate member having a row of suitable shift indicator indicia formed thereon, first and second lateral slots formed in said front and rear plate members, fastener means operatively connected to one of said front and rear plate members for securing said plate members in an abutting relationship, a trough-like pocket formed in said rear plate member, spring retainer means having an opening formed therethrough formed on one end of said pocket, first and second parallel slots formed in said respective front plate member and along the bottom of said pocket, first and second stop means formed on one end of said respective first and second parallel slots, a pointer body slidably mounted in said pocket, means formed on the peripheral surface of said pointer body for slidable cooperation with said respective first and second parallel slots, a vertical pointer formed on said means in slidable cooperation with said first parallel slot and extending to said row of indicia, connector means formed on a face of said pointer body, spring means compressed a predetermined amount between said face of said pointer body and said spring retainer means of said pocket for urging said means in slidable cooperation with said respective first and second parallel slots toward said respective first and second stop means, a cable connected at one end thereof to said connector means and extending through said spring means and said opening formed through said spring retainer means, adapted for selectively urging said pointer linearly past said indicia against the force of said spring means.

2. A shift indicator mechanism comprising a first plate having a row of suitable shift indicator indicia formed thereon, a first lateral slot formed in said first plate, first stop means formed at one end of said first lateral slot, fastener means formed on the edges of said first plate at selected locations therearound, a second plate abutted against said first plate and retained thereagainst by virtue of said fastener means, a lateral trough-like pocket having one closed end formed in said second plate adjacent said first lateral slot, an opening formed in said closed end, a second lateral slot formed in said pocket parallel to said first lateral slot, second stop means formed at one end of said second lateral slot adjacent said first stop means, a solid round body loosely mounted in said pocket, means formed on the peripheral surface of said solid round body and extending through said respective first and second lateral slots, a vertical pointer formed on said means extending through said first lateral slot, said vertical pointer extending past said row of indicia, connector means formed on a face of said solid round body, resilient means compressed a predetermined amount between said face of said body and said closed end of said pocket for urging said means extending through said respective first and second lateral slots toward said respective first and second stop means, a cable connected at one end thereof to said connector means and extending through said resilient means and said opening formed in said closed end of said pocket, adapted for providing linear motion to said pointer adjacent said indicia against the force of said resilient means.

3. A shift indicator mechanism comprising a front plate having a row of suitable shift indicator indicia formed thereon, a first lateral slot having at least one closed end formed in said front plate, said at least one closed end serving as a first stop means, a plurality of tabs formed on the edges of said front plate at selected locations therearound, a back plate abutted against said front plate and retained thereagainst by virtue of said tabs being bent around the edges of said back plate, a lateral U-cross-sectional-shaped pocket having a closed end formed in said back plate adjacent said first lateral slot, an opening formed in said closed end, a second lateral slot having at least one closed end formed in said pocket parallel to said first lateral slot, said latter at least one closed end serving as a second stop means adjacent said first stop means, a solid round body loosely mounted in said pocket, oppositely disposed first and second protrusions formed on the peripheral surface of said solid round body and extending through said respective first and second lateral slots, a vertical pointer formed on the end of said first protrusion and extending past said row of indicia, a connector formed on a face of said solid round body, a coil spring compressed a predetermined amount between said face of said body and said closed end of said pocket for urging said first and second protrusions toward said respective first and second stop means, a cable connected at one end thereof to said connector and extending through said coil spring and said opening formed in said closed end of said pocket, adapted for providing linear motion to said pointer adjacent said indicia against the force of said coil spring.

* * * * *